No. 863,529. PATENTED AUG. 13, 1907.
C. GAUVIN, H. CARTIER & E. BRUNEL.
AUTOMATIC WEIGHING DEVICE.
APPLICATION FILED MAY 11, 1906.

4 SHEETS—SHEET 1.

No. 863,529. PATENTED AUG. 13, 1907.
C. GAUVIN, H. CARTIER & E. BRUNEL.
AUTOMATIC WEIGHING DEVICE.
APPLICATION FILED MAY 11, 1906.

4 SHEETS—SHEET 2.

No. 863,529. PATENTED AUG. 13, 1907.
C. GAUVIN, H. CARTIER & E. BRUNEL.
AUTOMATIC WEIGHING DEVICE.
APPLICATION FILED MAY 11, 1906.

4 SHEETS—SHEET 3.

WITNESSES:
Wm D. Bell
A. Glatt

INVENTORS,
Camille Gauvin,
Henri Cartier,
Edouard Brunel
BY
Arthur Steward,
ATTORNEYS No. 863,529. PATENTED AUG. 13, 1907.
C. GAUVIN, H. CARTIER & E. BRUNEL.
AUTOMATIC WEIGHING DEVICE.
APPLICATION FILED MAY 11, 1906.

4 SHEETS—SHEET 4.

UNITED STATES PATENT OFFICE.

CAMILLE GAUVIN AND HENRI CARTIER, OF BRUSSELS, BELGIUM, AND EDOUARD BRUNEL, OF PARIS, FRANCE.

AUTOMATIC WEIGHING DEVICE.

No. 863,529.　　　　Specification of Letters Patent.　　　　Patented Aug. 13, 1907.

Application filed May 11, 1906. Serial No. 316,270.

*To all whom it may concern:*

Be it known that we, CAMILLE GAUVIN and HENRI CARTIER, merchants, citizens of the French Republic, residing at Brussels, Belgium, and EDOUARD BRUNEL, merchant, a citizen of the French Republic, and residing at Paris, France, have invented new and useful Improvements in Automatic Weighing Devices; and we do hereby declare the following to be a full, clear, and exact description of the same.

Our present invention relates to automatic weighing devices, the object being to provide an apparatus of this kind, the balance-beam of which is brought to its balanced position by means of an automatically moved sliding-weight.

A further object of our invention is to provide an apparatus provided with a suitable recording device, showing and printing the several weighing results.

In contradistinction to other well-known constructions, the improved apparatus has its sliding-weight movable on a lever-arm arranged below the balance-beam and suitably connected with the same, said sliding-weight being actuated by an upper horizontal motor-shaft connected with a stationary clock-work and actuating also the recording device.

With these objects in view, the invention consists of the arrangement and combination of parts, fully described hereinafter and specifically pointed out in the appended claims.

Figure 1:
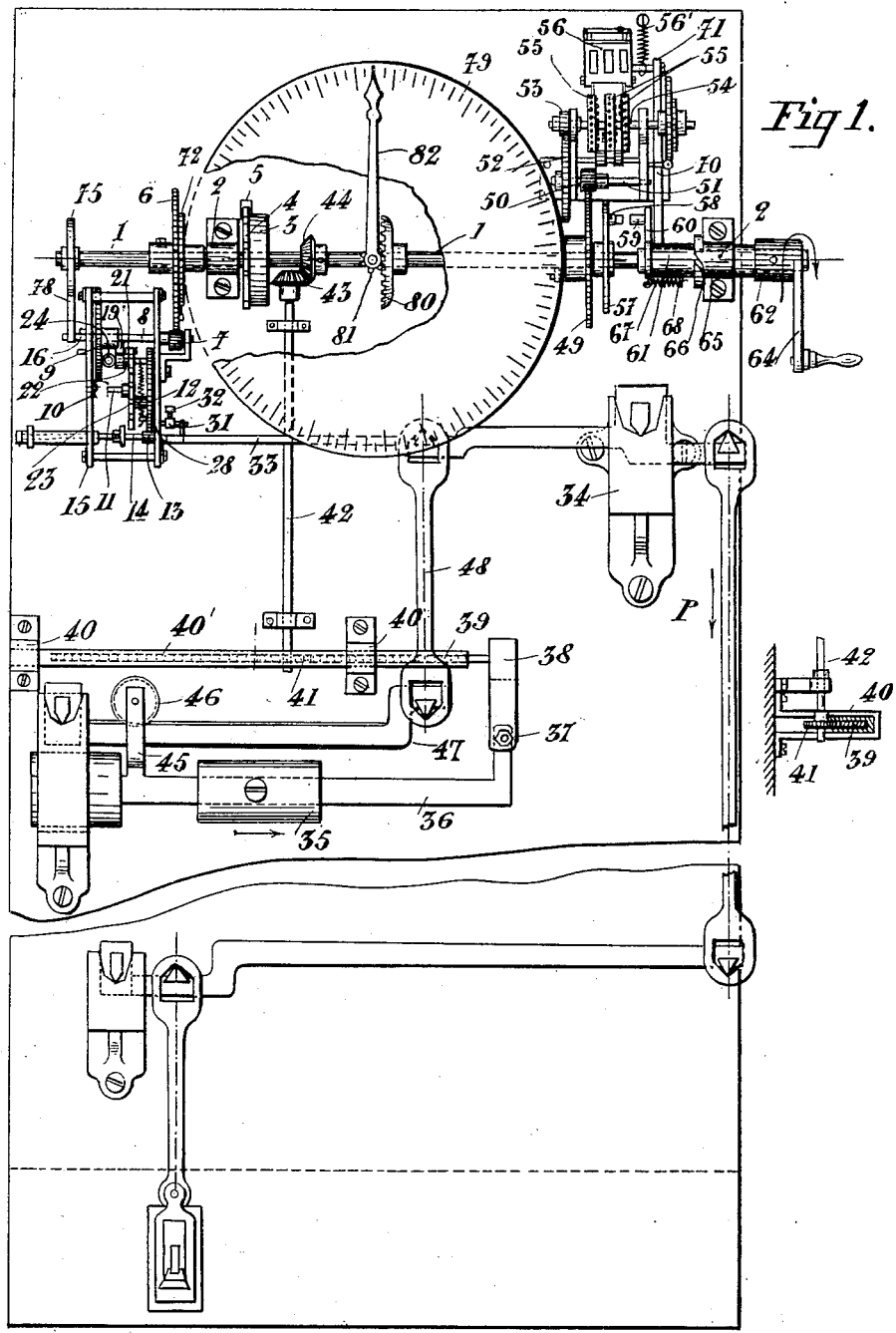
Figure 2:
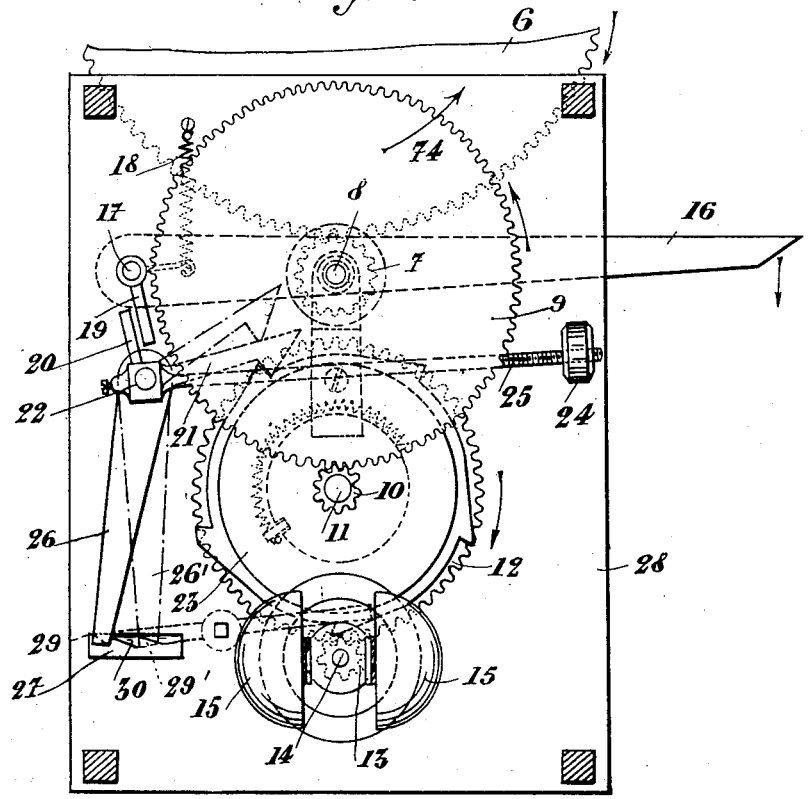
Figure 3:
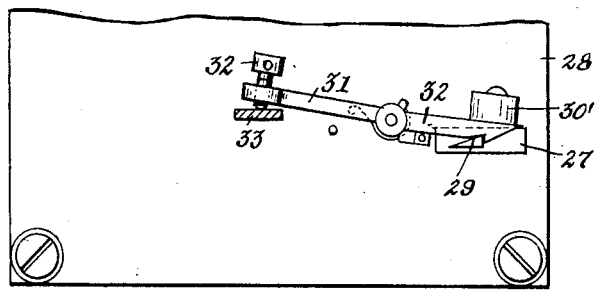
Figure 3A:
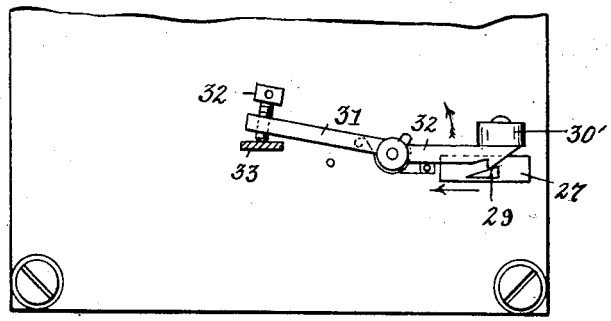
Figure 3B:
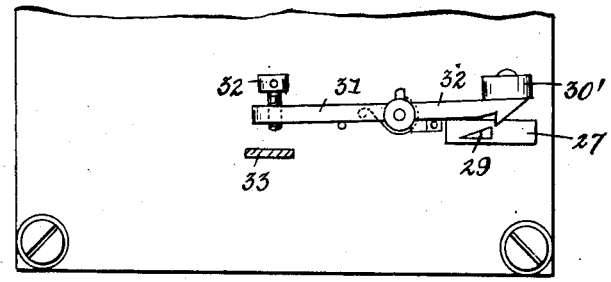
Figure 4:
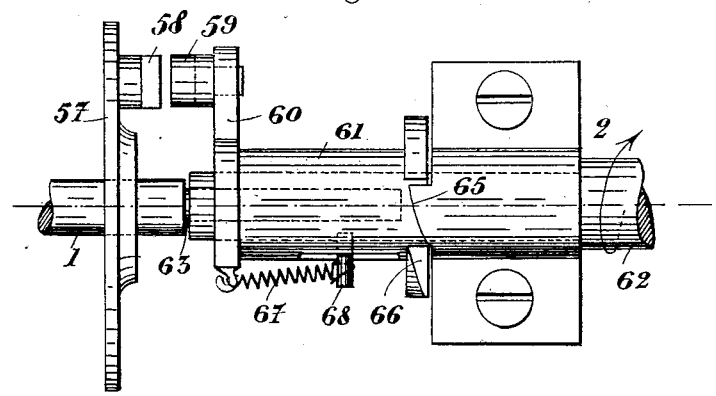
Figure 5:
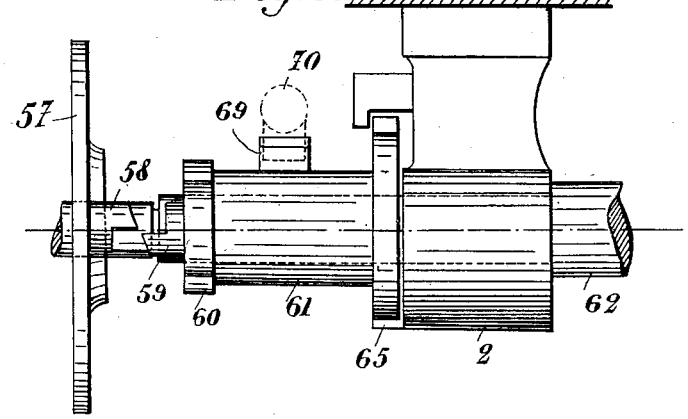
Figures 6, 7:
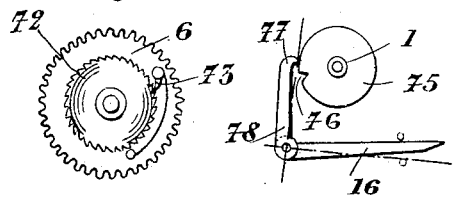

In the accompanying drawings: Figure 1 shows the elevation of the complete mechanism of our improved weighing balance. Fig. 2 is an enlarged side elevation of the engaging and disengaging device of the balance. Fig. 3 is an enlarged side elevation of the pawl mechanism actuated by the balance-beam and showing said mechanism holding a certain arm 26 out of its normal position. Fig. 3ᴬ shows the parts of Fig. 3 as the part 29 of the arm 26 is passing under the head of the pawl 30 to be finally caught and held thereby; Fig. 3ᴮ shows the same parts when the balance beam has descended and the lever comprising parts 30 and 31 has correspondingly moved sufficiently to permit arm 26 to return to its normal position. Fig. 4 is an enlarged front elevation of the device serving to bring the parts back to their initial position. Fig. 5 shows the top plan view of same. Fig. 6 is a detail view of the gear-wheel transmitting the movement from the main shaft to the mechanism shown in Fig. 2, and Fig. 7 shows a detail view of the device preventing the depression of the weighing lever so long as the recording apparatus is not brought back to zero.

Referring to the drawings, 1 represents the main shaft, journaled in bearings 2, 2 and on which is arranged the drum 3, containing a motor-spring of well-known construction. The drum 3 carries a ratchet-wheel 4 engaged by a pawl 5 and whereby the initial tension of the motor-spring may be adjusted as desired, the tension, when adjusted, being maintained for all weighing operations. Near the left hand side end of the shaft 1 is arranged a loose gear-wheel 6, meshing with a toothed pinion 7 arranged on the shaft 8 connected with another lower shaft 11 through the agency of the toothed wheels 9 and 10. The rotary movement is transmitted from the shaft 11 through gear-wheels 12 and 13 to the shaft 14, provided with a suitable regulator 15 of any well-known construction.

The weighing lever 16 actuated by the spring 18 is secured on a shaft 17 parallel to the shaft 8 and has a small downwardly projecting arm 19 (Fig. 2) which, when the weighing lever 16 is depressed, engages the arm 20 of a bell-crank lever 20, 21 secured on the shaft 22 and the arm 21 of which is made of the form of a pawl. The latter engages the ratchet-wheel 23 secured on the shaft 11 and is held in engagement by the weight 24, adjustably arranged on the arm 25 secured to the shaft 22. The latter has also a downwardly projecting arm 26, the lower end of which is bent at right angles and extends through a slot 27 provided in the plate 28 of the frame. Said bent end has a bevel 29 (Fig. 3) which is normally situated below the head of the pawl 30 weighted by means of a weight 30′ and yieldingly connected with the swinging arm 31, the free end of which is provided with an adjustable screw-pin 32 engaged by the end of the balance-beam 33 swinging on the bearing 34, when the charge P to be weighed acts on the opposite end of said balance-beam. The pawl 30 serves to hold the arm 26 and its beveled end 29 in the positions 26′ and 29′, respectively, indicated in dotted lines, until the balance-beam 33 is brought to its balanced position by the automatically moved sliding-weight 35 (Fig. 1).

The sliding-weight 35 is adjustably secured on an angle-piece 36, pivotally connected at 37 with the arm 38 depending from the rack 39, movable longitudinally in a guide-socket 40′ secured to brackets 40, said rack being engaged by a toothed pinion 41 secured to the lower end of a vertical shaft 42, carrying at its upper end a bevel gear-wheel 43 meshing with a similar gear-wheel 44 fast on the main shaft 1. The angle-piece 36 has an upwardly projecting arm 45 provided with a roller 46 adapted to roll on the upper side of a lever-arm 47 swinging on a prism and transmitting the action of the sliding-weight 35 to the balance-beam 33 through a suitable connection 48.

On the right hand side the main shaft 1 has a gear-wheel 49 transmitting the rotary movement of said shaft by means of a gear-wheel 50 to the shaft 51 of the recording device. Said shaft 51 actuates through gear-wheels 52 and 53 the shaft 54 carrying the type-disks 55 provided with projecting or other types. These type-disks are rotated successively in a well-known way when the recording device is actuated by the main shaft 1. The projecting types are caused to print on a card carried by a flap 56 when the latter is pressed upon the types in the manner described hereinafter.

The shaft 1 carries near the gear-wheel 49 a disk 57 having a lateral projection 58 adapted to be engaged by a projection 59 of the arm 60 attached to the sleeve 61, movable longitudinally on the rotary bearing 62 of the shaft 1 and rotatable with the bearing, in which the end of said shaft is journaled, while the bearing itself can be rotated in the bearing 2 by means of the hand-crank 64. Arranged on the inner side of the bracket 2 is a screw-surface 65 engaged by the correspondingly shaped side-face 66 of the sleeve 61, when the bearing 62 is rotated in the direction of the arrow (Fig. 1). The sleeve is pressed against the bracket by the action of a spring 67 attached at one end to the sleeve and at the opposite end to a pin 68 arranged on the bearing 62 and projecting through a slot provided in the sleeve 61. The latter has also a projecting lug 69, engaging a finger of the lever 70 when the sleeve is rotated. Said lever 70 is fast on the shaft 71 carrying the flap 56 and held in its normal position by the action of a spring 56'. Arranged on one side of the loose gear-wheel 6 is a ratchet wheel 72 engaged by a pawl 73 carried by said gear-wheel, so that the latter is not actuated when the shaft 1 is rotated in the direction of the arrow 74 (Fig. 2) and rotated with said shaft in opposite direction. In this way, the mechanism shown in Fig. 2 is not actuated when the several parts are brought back to their initial positions by means of the hand-crank 64.

In order to prevent the depression of the weighing lever 16, when the recording device is not placed on zero, the shaft 1 carries at its left hand side end a disk 75 provided with a notch 76 engaged by the end 77 of the arm 78 rigidly attached to the weighing lever 16 when the shaft 1 is in a position corresponding to zero. When said shaft is in another position, said notch 76 is not in front of the engaging finger 77 of the arm 78 and the weighing lever 16 cannot be depressed to start the devices.

The improved automatic weighing balance operates as follows:—The recording device and shaft 1 being brought back to their initial position by means of the hand-crank 64, and the charge to be weighed being placed upon the bridge (when the invention is applied to a weigh-bridge) connected in a well-known way with the balance-beam 33, all that is necessary to do is to depress the weighing lever 16 to disengage the pawl 21 from the ratchet-wheel 23, and release the shaft 1 which is immediately rotated by the action of the motor-spring arranged within the spring-case 3. Said pawl 21 is held in its raised position by the engagement of the pawl 30 over the bent arm 29 so long as the balance-beam 33 is pressed against the arm 31 by the action of the charge to be weighed. As soon as the shaft 1 is rotated, the sliding-weight 35 is moved to the right hand side of Fig. 1 by means of the connections described, while the recording device 55 is actuated by the gear-wheel 49. When the sliding-weight 35 has brought the balance-beam 33 to its balanced position, the latter releases the pin 32 of the arm 31, so that the latter drops downwardly and raises the pawl 30 to release the arm 29, whereby the latter and the arm 26 are brought back to their normal position by the action of the weight 24, the pawl 21 then engaging again the ratchet-wheel 23 to stop the movements of the main shaft 1 and the recording device.

In order to print the weighing result on the card inserted into the flap 56, the operator rotates the hand-crank from the left to the right, whereby the lug 69 of the sleeve 61 causes the lever 70 to swing and to press the flap 56 or rather the card or ticket carried thereby upon the projecting types of the type-disks adjusted according to the weighing. During the rotation of the hand-crank 64, the sleeve 61 engages the screw or helicoidal side face of the bracket 2 and is thereby brought nearer to the disk 57, so that the projection 59 of said sleeve 61 engages the projection 58 of the disk 57 to rotate the latter and therefore the main shaft 1 back to their initial positions, bringing at the same time the recording device back to zero. These backward movements, which are not imparted to the locking mechanism (Fig. 2) by reason of the peculiar arrangement of the gear-wheel 6, also cause the sliding-weight 35 to move back to its initial position, whereupon the apparatus is ready for another weighing operation.

In order to deaden the jerks produced on the parts by the sudden engagement of the pawl 21 with the ratchet-wheel 23 (upon the balancing of the parts), said ratchet-wheel is secured on its shaft 11 by means of a suitable spring, so that it is yieldingly mounted in the direction of the movement. The gear-wheel 49 is arranged in like manner in order to deaden the jerks produced by the striking of the projection 59 against the projection 58.

We may also provide our improved weighing machine with a dial 79 permitting of reading the weighing results. In this case the shaft 1 carries a gear-wheel 80, meshing with a gear-wheel 81 arranged on the shaft of the hand 82, in order to move the hand simultaneously with the shaft 1 and the recording device 55 when the latter is used.

Having fully described our invention, what we claim and desire to secure by Letters Patent is:—

1. The combination of an indicating mechanism, a rotary shaft controlling said mechanism, means normally acting to rotate said shaft, a detent mechanism for said means, said mechanism being manually actuative to release said means but normally movable to restrain the same, means, comprising a load-actuated part directly controlling said detent mechanism, for holding the latter out of restraining engagement with said first named means when manually retracted, means, operatively connected with the load-actuated part, for balancing said load-actuated part and thereby restoring said part to its position of inactivity with respect to said detent mechanism, and means, operative from said shaft, for causing said balancing means to assume the balancing relation, substantially as described.

2. The combination of an indicating mechanism, a rotary shaft controlling said mechanism, means normally acting to rotate said shaft, a detent mechanism for said means, said mechanism being manually actuative to release said means but normally movable to restrain the same, means, comprising a load-actuated part directly controlling said detent mechanism, for holding the latter out of restraining engagement with said first named means when manually retracted, a lever, operative connecting means between said lever and the load actuated part, a weight slidable on said lever, and means for moving said weight operatively connected with said shaft, substantially as described.

3. The combination of an indicating mechanism, a rotary shaft controlling said mechanism, means normally acting to rotate said shaft, a detent mechanism for said means, said mechanism being manually actuative to release said means but normally movable to restrain the same, means, comprising a load-actuated lever directly controlling said detent mechanism, for holding the latter out of restraining engagement with said first named means when manually retracted, another lever, operative connecting means between said levers, a weight slidable on said last named lever, and means for moving said weight operatively connected with said shaft, substantially as described.

4. The combination of an indicating mechanism, a rotary shaft controlling said mechanism, means normally acting to rotate said shaft, a detent mechanism for said means, said mechanism being manually actuative to release said means but normally movable to restrain the same, means, comprising a load-actuated part directly controlling said detent mechanism, for holding the latter out of restraining engagement with said first named means when manually retracted, means, operatively connected with the load-actuated part, for balancing said load-actuated part and thereby restoring said part to its position of inactivity with respect to said detent mechanism, means, operative from said shaft, for causing said balancing means to assume the balancing relation, a crank, and means controlled by said crank, for resetting said shaft and the indicating mechanism, substantially as described.

5. The combination of an indicating mechanism, a rotary shaft controlling said mechanism, means normally acting to rotate said shaft, a detent mechanism for said means, said mechanism being manually actuative to release said means but normally movable to restrain the same, means, comprising a load-actuated part directly controlling said detent mechanism, for holding the latter out of restraining engagement with said first named means when manually retracted, means, operatively connected with the load-actuated part, for balancing said load-actuated part and thereby restoring said part to its position of inactivity with respect to said detent mechanism, means, operative from said shaft, for causing said balancing means to assume the balancing relation, a printing mechanism, a crank, and means controlled by the crank for resetting said shaft and the indicating mechanism and for actuating the printing mechanism, substantially as described.

In testimony whereof, we have signed our names to this specification in the presence of two subscribing witnesses.

CAMILLE GAUVIN.
HENRI CARTIER.
EDOUARD BRUNEL.

Witnesses as to Camille Gauvin and Henri Cartier:
CHARLES HONDUS,
GREGORY PHELAN.

Witnesses as to Edouard Brunel:
JACK BAKER,
HANSON C. COXE.